Feb. 9, 1954   F. R. MERRIAM, JR   2,668,924
DYNAMOELECTRIC MACHINE

Filed Nov. 3, 1950   3 Sheets-Sheet 1

INVENTOR.
FRANK RICHARD MERRIAM
BY Martin J. Finnegan
Attorney

Feb. 9, 1954 F. R. MERRIAM, JR 2,668,924
DYNAMOELECTRIC MACHINE
Filed Nov. 3, 1950 3 Sheets-Sheet 2
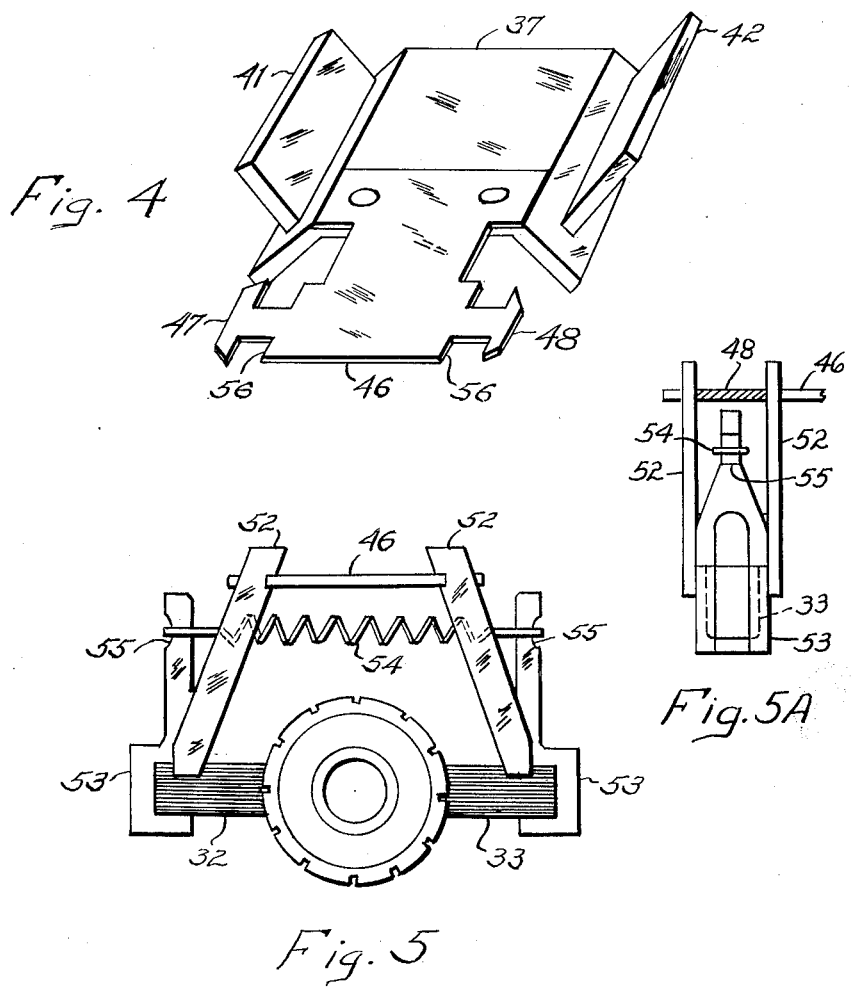
INVENTOR.
FRANK RICHARD MERRIAM
BY
Martin J. Finnegan
ATTORNEY Feb. 9, 1954 F. R. MERRIAM, JR 2,668,924
DYNAMOELECTRIC MACHINE
Filed Nov. 3, 1950 3 Sheets-Sheet 3

INVENTOR.
FRANK RICHARD MERRIAM
BY
Martin J. Finnegan
Attorney

Patented Feb. 9, 1954

2,668,924

UNITED STATES PATENT OFFICE 2,668,924

DYNAMOELECTRIC MACHINE

Frank Richard Merriam, Jr., Owosso, Mich., assignor to Redmond Company, Inc., Owosso, Mich., a corporation of Michigan Application November 3, 1950, Serial No. 193,855

8 Claims. (Cl. 310—239)

This invention relates to dynamo-electric machines, and particularly to motors for light duty, and of fractional horsepower capacity; but current generators, as well as motors, and combination machines, such as inverters and dynamotors, may embody some or all of the inventive concepts herein disclosed.

An object of the invention is to provide a machine having relatively few parts, each of relatively simple construction, and all adapted for ready assembly into operative interrelationship.

A second object is to provide a machine having a field structure of novel composition, with its component parts fabricated in a novel manner;

A third object is to provide a machine having a brush-carrying assemblage of novel construction.

A fourth object is to provide a machine having a stator assemblage including polar projections and brush supporting elements constructed and inter-related in a novel manner to achieve maximum efficiency and accessibility at a minimum of cost, and with the expenditure of a minimum of effort.

Other objects and advantages, pertaining to specific parts of the complete organization, will be indicated by the following description.

In the drawings:

Fig. 4 is a perspective view of one of the field retaining clamps used in the machine shown in Fig. 1;

Fig. 5 is an elevation view of the complete brush assembly;

Fig. 5A is a side view of the assembly;

Figure 1:
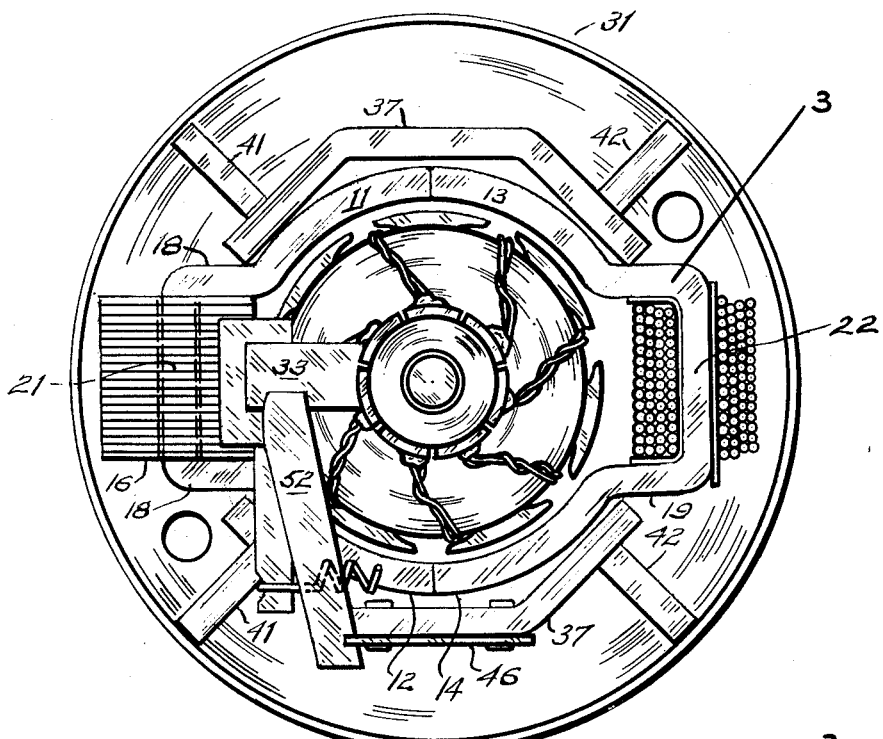
Fig. 1 is a transverse view partly in section showing an electric motor embodying the features of the invention.

As illustrated in Fig. 1 the invention is shown as embodied in a machine having a rotor assembly consisting of an armature of the usual laminated construction and a commutator to whose successive segments are connected the coiled armature loops extending through successive slots provided in the armature periphery. The armature is adapted to rotate within a completely closed stationary magnetic circuit formed by a pair of semicircular polar elements of soft steel one of which elements has its end faces 11 and 12 so disposed as to form an abutment with the corresponding end faces 13 and 14 respectively of the companion polar element. From these abutting end faces the two polar elements extend first in circular paths concentric with the curvature of the armature periphery and spaced therefrom only sufficiently to provide a safe clearance for rotation of the armature assembly therewithin while assuring maximum inductive action as between the polar elements on the one hand and the rotating armature conductors on the other. As the polar end portions of the magnetic elements approach the positions occupied by their associated field coils 16 and 17 respectively the said end portions curve outwardly forming parallel intermediate sections as indicated at 18 and 19 respectively which parallel sections embrace and join with the core sections 21 and 22 respectively, the latter being the portions of the magnetic elements upon which the said field coils 16 and 17 are wound as illustrated in Fig. 1. The two magnetic elements thus constitute the entire "iron circuit" of the motor field and thus take the place of the usual plurality of laminated assemblies comprising the field structure in a conventional multi-polar machine.

Figure 2:
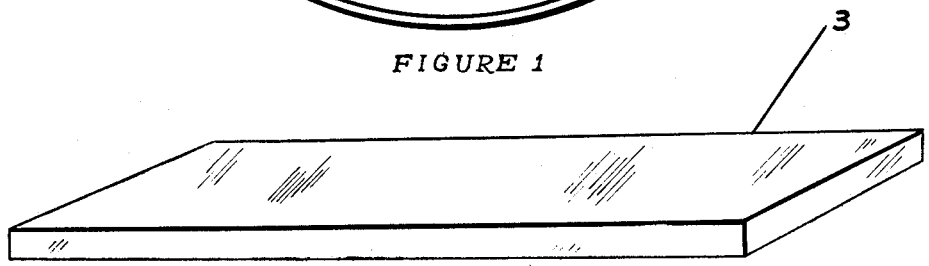
Fig. 2 is a view showing a plate of magnetic steel having proportions suitable for use in the formation of one of the field elements of the motor shown in Fig. 1.
Figure 3:
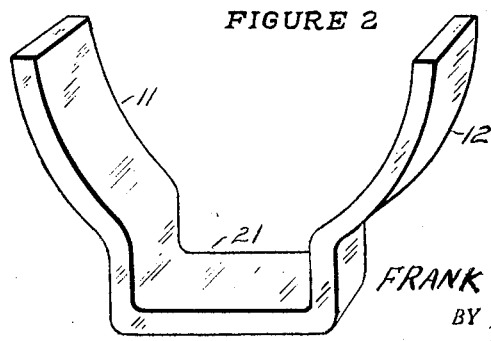
Fig. 3 is a view of the magnetic element shown in Fig. 2 after it has been transformed to a shape appropriate for use in the assembly of Fig. 1.

Figs. 2 and 3 indicate the manner in which the two (or more, if the machine has more than two poles) magnetic elements are formed. As indicated in Fig. 2 each element consists of a single flat plate of suitable soft steel; each plate being of a length, width and thickness to conform to the corresponding dimensions of the armature and field elements of the particular motor with which they are to be associated. The thickness of the material is preferably chosen to conform to that of commercially available strip or sheet material so that the rectangular plates of the proportions indicated in Fig. 2 may be conveniently and economically cut from such commercially available strips or sheets. After being cut to the desired rectangular dimensions as indicated in Fig. 2 each plate is subjected to the application of a suitable power press-operated forming tool to transform the plate into its operative contour as illustrated in Fig. 3, thus forming the arcuate wing sections 11, 12, 13, 14 previously described, and at the same time forming the central core sections 21, 22 which are to receive the field windings 16, 17 as illustrated in Fig. 1.

Fig. 1 also illustrates the method of retaining the assembled field elements and their windings in operative relationship to the armature assembly and to the surrounding housing element shown in the form of a cylindrical hood 31; the said positioning elements also constituting part of the structure for supporting and maintaining the commutator brushes 32 and 33 in operative contact with the rotating surfaces of the commutator. As shown in Fig. 1 such field positioning is accomplished by providing two clamping members 37 disposed in diametrically opposite positions in embracing relationship to the wing portions of the magnetic field elements, each of the said clamping elements being of a generally arcuate contour and of sufficient extent to cause its opposite ends to bear against the intermediate parallel portions 18 and 19, respectively, of the field elements and thus exert a clamping and position maintaining pressure upon the entire field assembly; the anchoring reaction being provided for by the engagement of the rearwardly extending tabs 41 and 42 against the inner surface of the housing element 31, which housing element thus absorbs all stress reactions and thereby cooperates with the clamping elements 37 in the maintenance of the field assembly in properly spaced relationship to the rotor assembly mounted therewithin.

As indicated in Figs. 4 and 5, as well as in Fig. 1, one only of the clamping elements 37 is provided with an extending double-ended tongue portion 46 whose end portions 47 and 48 are suitably apertured or notched to receive a pair of brush-carrying arms 52 formed of a moulded insulating material and terminating in suitably spaced extensions 53 forming yokes adapted to receive and grip the rectangular blocks of carbon constituting the brushes 32 and 33; the two arms 52 being yieldably urged toward each other by the provision of a coiled tension spring 54 whose looped ends are secured in suitable grooves or notches 55 in the said arms 52 and thus tend to lock the said arms about bearing points in the tongue 46, which bearing points are indicated at 56 (Fig. 4) as in the form of knife edges provided on the shoulders of the end portions 47, 48 of the tongue 46, which knife edges receive corresponding notches in the arms 52. This construction makes the parts readily detachable but at the same time assures desirable adaptability to changing conditions resulting from the progressive wearing of the brushes 32, 33 during periods of operation of the machine; the spring 54 serving as the means for automatically contracting the brush arms toward the center of rotation of the assembly as progressive wear of the brushes takes place.

It will be observed that the entire field assembly as well as the brush supporting assembly is adapted to be installed and maintained in operative relationship to the rotor assembly solely by the pressing action of the tabs 41, 42 against the inner surface of the housing element 31 and without resort to the use of any screws, bolts, rivets or other commercial fastening elements.

Figure 6:
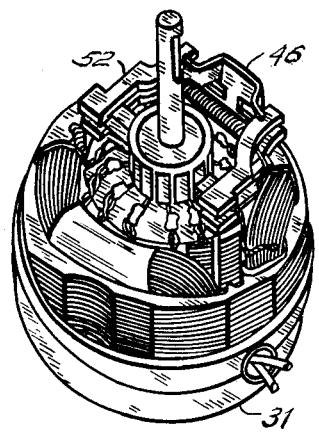
Fig. 6 is a perspective view of a motor assembly differing somewhat from that of Fig. 1.
Figure 7:
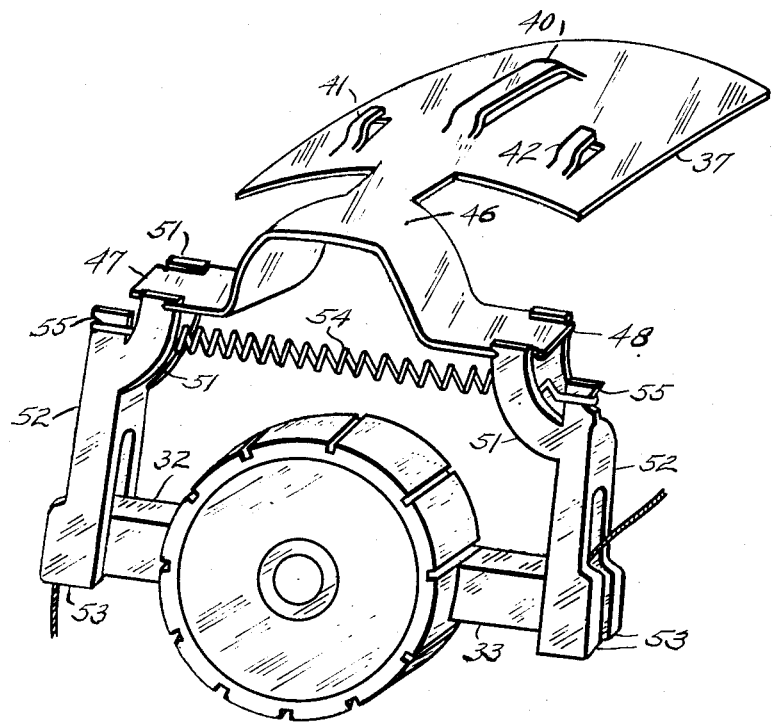
Fig. 7 is a perspective view of the brush assembly for the motor of Fig. 6.

Figs. 6 and 7 show a motor of somewhat different construction, in which the brush arms 52 are generally similar to those of Fig. 5, except for the addition of fingers 51 (see Fig. 7) rockably and detachably mounted on a tongue-like extension 46 of a thin plate 37 having tabs 40, 41, 42 to resiliently bear against housing element 31 and thereby retain the brush assembly in place; the said tabs being comparable to those similarly designated in Fig. 1.

What I claim is:

1. In combination, a motor casing, a stator mounted within said casing with a gap between said stator and said casing, an armature rotatably mounted within said stator and having a commutator extending outwardly axially beyond said stator, a member retained in said gap, a portion of said member projecting out of said gap over said commutator, said member portion having bearing surfaces of appreciable effective length on both sides thereof and oriented substantially parallel to the axis of said armature, brush-holding arms having ends of an overall width not substantially less than the effective length of said bearing surfaces and having surfaces pivotally engageable with said bearing surfaces at least at points spaced an appreciable distance widthwise of said arm ends, means for preventing longitudinal movement of said arms relative to said bearing surfaces, brushes carried by said arms and engaging spaced portions of said commutator, and resilient means operatively connected to said arms and urging them to pivot in such a direction as to press said brushes against said commutator.

2. In combination, a motor casing, a stator mounted within said casing with a gap between said stator and said casing, an armature rotatably mounted within said stator and having a commutator extending outwardly axially beyond said stator, a member retained in said gap, a portion of said member projecting out of said gap over said commutator, said member portion having bearing surfaces of appreciable effective length on both sides thereof and oriented substantially parallel to the axis of said armature, brush-holding arms having ends of an overall width not substantially less than the effective length of said bearing surfaces and having surfaces pivotally engageable with said bearing surfaces at least at points spaced an appreciable distance widthwise of said arm ends, means for preventing longitudinal movement of said arms relative to said bearing surfaces, brushes carried by said arms and engaging spaced portions of said commutator, and resilient means operatively connected to said arms and urging them to pivot in such a direction as to press said brushes against said commutator, said arms being supported only at one end where they engage their respective bearing surfaces.

3. In combination, a motor casing, a stator mounted within said casing with a gap between said stator and said casing, an armature rotatably mounted within said stator and having a commutator extending outwardly axially beyond said stator, a member retained in said gap, a portion of said member projecting out of said gap over said commutator, said member portion having laterally projecting tongues on both sides thereof with outer narrowed parts of appreciable width, edges of said tongues between the body of said tongues and the narrowed parts thereof and on both sides of said tongues being oriented at least in part substantially parallel to the axis of said armature and defining laterally spaced bearing surfaces, brush-holding arms having bifurcated ends of width greater than and fitting over said narrowed tongue parts and having surfaces pivotally engageable with said bearing surfaces on said tongues, each of said arms thus being pivotally mounted on said bearing surfaces along laterally spaced bearing lines, brushes carried by said arms and engaging spaced portions of said commutator, and resilient means operatively connected to said arms and urging them to pivot in such a direction as to press said brushes against such said commutator.

4. In the combination of claim 3, means for preventing longitudinal movement of said arms relative to said tongues.

5. In combination, a motor casing, a stator mounted within said casing with a gap between said stator and said casing, an armature rotatably mounted within said stator and having a commutator extending outwardly axially beyond said stator, a member retained in said gap, a portion of said member projecting out of said gap over said commutator, said member portion having laterally projecting tongues on both sides thereof with outer narrowed parts of appreciable width, edges of said tongues between the body of said tongues and the narrowed parts thereof and on both sides of said tongues being oriented at least in part substantially parallel to the axis of said armature and defining laterally spaced bearing surfaces, brush-holding arms having bifurcated ends of width greater than and fitting over said narrowed tongue parts and having notches in which said bearing surface edges of said tongues are received, each of said arms thus being pivotally mounted on said bearing surfaces along laterally spaced bearing lines, brushes carried by said arms and engaging spaced portions of said commutator, and resilient means operatively connected to said arms and urging them to pivot in such a direction as to press said brushes against said commutator, said arms being supported only at one end where they engage their respective tongues.

6. In combination, a motor casing, a stator mounted within said casing with a gap between said stator and said casing, an armature rotatably mounted within said stator and having a commutator extending outwardly axially beyond said stator, a member in but thinner than said gap and having portions raised to an extent sufficient to bridge said gap, thereby fixedly supporting said member in said gap, a portion of said member projecting out of said gap over said commutator, said member portion having laterally projecting tongues on both sides thereof with outer narrowed parts of appreciable width, edges of said tongues between the body of said tongues and the narrowed parts thereof and on both sides of said tongues being oriented at least in part substantially parallel to the axis of said armature and defining laterally spaced bearing surfaces, brush-holding arms having bifurcated ends of width greater than and fitting over said narrowed tongue parts and having surfaces pivotally engageable with said bearing surfaces on said tongues, each of said arms thus being pivotally mounted on said bearing surfaces along laterally spaced bearing lines, brushes carried by said arms and engaging spaced portions of said commutator, and resilient means operatively connected to said arms and urging them to pivot in such a direction as to press said brushes against said commutator.

7. In the combination of claim 6, means for preventing longitudinal movement of said arms relative to said tongues.

8. In combination, a motor casing, a stator structure mounted within said casing with a gap between said stator and said casing, an armature rotatably mounted within said stator and having a commutator extending outwardly axially beyond said stator, a member in but thinner than said gap and having portions raised to an extent sufficient to bridge said gap, thereby fixedly supporting said member in said gap, a portion of said member projecting out of said gap over said commutator, said member portion having laterally projecting tongues on both sides thereof with outer narrowed parts of appreciable width, edges of said tongues between the body of said tongues and the narrowed parts thereof and on both sides of said tongues being oriented at least in part substantially parallel to the axis of said armature and defining laterally spaced bearing surfaces, brush-holding arms having bifurcated ends of width greater than and fitting over said narrowed tongue parts and having notches in which said bearing surface edges of said tongues are received, each of said arms thus being pivotally mounted on said bearing surfaces along laterally spaced bearing lines, brushes carried by said arms and engaging spaced portions of said commutator, and resilient means operatively connected to said arms and urging them to pivot in such a direction as to press said brushes against said commutator, said arms being supported only at one end where they engage their respective tongues.

FRANK RICHARD MERRIAM, Jr.

References Cited in the file of this patent

UNITED STATES PATENTS

| Number | Name | Date |
|---|---|---|
| 703,100 | Wantz | June 24, 1902 |
| 1,857,209 | Moore | May 10, 1932 |
| 2,112,747 | Wood | Mar. 29, 1938 |
| 2,477,150 | Snyder et al. | July 26, 1949 |
| 2,504,564 | Merriam | Apr. 18, 1950 |
| 2,518,479 | Lee | Aug. 15, 1950 |

FOREIGN PATENTS

| Number | Country | Date |
|---|---|---|
| 465,039 | Great Britain | Apr. 23, 1937 |
| 772,159 | France | Aug. 13, 1934 |